United States Patent
Garreau

(10) Patent No.: US 9,499,266 B1
(45) Date of Patent: Nov. 22, 2016

(54) FIVE-WING AIRCRAFT TO PERMIT SMOOTH TRANSITIONS BETWEEN VERTICAL AND HORIZONTAL FLIGHT

(71) Applicant: Elytron Aircraft LLC, Del Mar, CA (US)

(72) Inventor: Oliver Garreau, Mountain View, CA (US)

(73) Assignee: Elytron Aircraft LLC, Mountain View, CA (US)

( * ) Notice: Subject to any disclaimer, the term of this patent is extended or adjusted under 35 U.S.C. 154(b) by 0 days.

(21) Appl. No.: 14/747,101

(22) Filed: Jun. 23, 2015

Related U.S. Application Data

(60) Provisional application No. 62/016,525, filed on Jun. 24, 2014.

(51) Int. Cl.
*B64C 15/12* (2006.01)
*B64C 39/08* (2006.01)
*B64C 9/00* (2006.01)

(52) U.S. Cl.
CPC *B64C 39/08* (2013.01); *B64C 9/00* (2013.01)

(58) Field of Classification Search
CPC ....... B64C 27/22; B64C 27/26; B64C 27/28; B64C 29/00; B64C 29/0008; B64C 29/0016; B64C 29/0033; B64C 39/00; B64C 39/06; B64C 39/064; B64C 39/066; B64C 39/068; B64C 39/08; B64C 39/12; B64C 39/062; B64C 2201/088; B64C 2201/162

USPC ............................ 244/6, 7 R, 7 A, 7 C, 12.2
See application file for complete search history.

(56) References Cited

U.S. PATENT DOCUMENTS

| | | | | |
|---|---|---|---|---|
| 3,653,611 A | * | 4/1972 | Trupp | B64C 3/385 244/48 |
| 3,834,654 A | * | 9/1974 | Miranda | B64C 39/068 244/13 |
| 4,856,736 A | * | 8/1989 | Adkins | B64C 39/068 244/45 R |
| 2007/0215746 A1 | * | 9/2007 | Rieken | B64C 39/06 244/6 |
| 2010/0224721 A1 | * | 9/2010 | Wood | B64C 29/0025 244/12.3 |
| 2013/0099065 A1 | * | 4/2013 | Stuhlberger | B64C 29/0033 244/7 C |

* cited by examiner

*Primary Examiner* — Richard G Davis
(74) *Attorney, Agent, or Firm* — Plager Schack LLP

(57) ABSTRACT

A five-wing aircraft transitions smoothly between vertical and horizontal flight modes, and enhances pitch neutrality of the aircraft when in flight at all speeds to improve flight efficiency. The aircraft includes a fuselage, a fixed wing assembly coupled to the fuselage and having a front fixed wing and a rear fixed wing, the front fixed wing coupled to the front portion of the fuselage and the rear fixed wing coupled to the rear portion of the fuselage, the front fixed wing and rear fixed wing being connected together by winglets, a tilt-wing pivotably mounted to the central portion of the fuselage, and a pair of rotary wings coupled to the tilt-wing. The tilt-wing pivotably adjusts to permit the aircraft to transition smoothly between vertical and horizontal flight. The rotary wings generate thrust or lift depending on the orientation of the tilt-wing.

8 Claims, 4 Drawing Sheets

FIVE-WING AIRCRAFT TO PERMIT SMOOTH TRANSITIONS BETWEEN VERTICAL AND HORIZONTAL FLIGHT

RELATED APPLICATION

The application claims priority to provisional patent application U.S. Ser. No. 62/016,525 filed on Jun. 24, 2014, the entire contents of which is herein incorporated by reference.

BACKGROUND

The embodiments herein relate generally to aircraft.

Fixed-wing aircraft provide passengers with an efficient mode of transportation due to their high cruising speeds. However, fixed-wing aircraft are limited in that they are designed to operate most effectively when flying horizontally. As a result, these aircraft require significant airspace for takeoffs and landings. Helicopters comprise a rotary-wing system, which allows vertical takeoffs and landings. However, these vehicles are limited because they have poor aerodynamics, which affects their cruising performance and cruise efficiency.

The Boeing V-22 Osprey is a military aircraft that comprises a tilt-wing to permit both vertical and horizontal flight. However, this aircraft is not practical for general aviation use. In addition, this aircraft does not utilize a closed fixed wing assembly design that enhances pitch neutrality of the aircraft when in flight at all speeds to improve flight efficiency.

As such, there is a need in the industry for an aircraft that enables smooth transitions between vertical and horizontal flight modes, which overcomes limitations of the prior art and enhances aircraft performance, efficiency and safety.

SUMMARY

A five-wing aircraft configured to permit smooth transitions between vertical and horizontal flight is provided. The aircraft is further configured to enhance pitch neutrality of the aircraft when in flight at all speeds to improve flight efficiency. The five-wing aircraft comprises a fuselage comprising a front portion, central portion and rear portion, a fixed wing assembly coupled to the fuselage and comprising a front fixed wing and a rear fixed wing, the front fixed wing coupled to the front portion of the fuselage and the rear fixed wing coupled to the rear portion of the fuselage, the front fixed wing and rear fixed wing being connected together by winglets, a tilt-wing pivotably mounted to the central portion of the fuselage, and a pair of rotary wings coupled to the tilt-wing, wherein the tilt-wing is configured to be pivotably adjusted to permit the aircraft to transition smoothly between vertical and horizontal flight, wherein the pair of rotary wings are configured to generate thrust or lift depending on the orientation of the tilt-wing.

BRIEF DESCRIPTION OF THE FIGURES

The detailed description of some embodiments of the invention will be made below with reference to the accompanying figures, wherein the figures disclose one or more embodiments of the present invention.

DETAILED DESCRIPTION OF CERTAIN EMBODIMENTS

Figure 1:
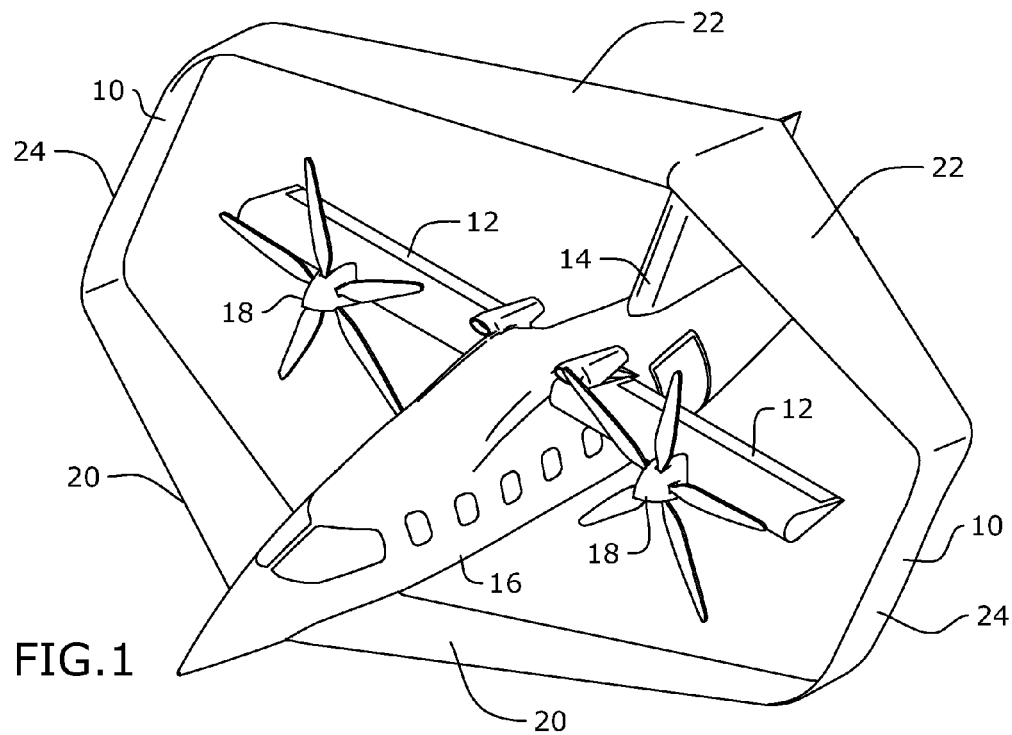
FIG. 1 depicts a perspective view of certain embodiments of the five-wing aircraft with the tilt-wing in a horizontal configuration.
Figure 2:
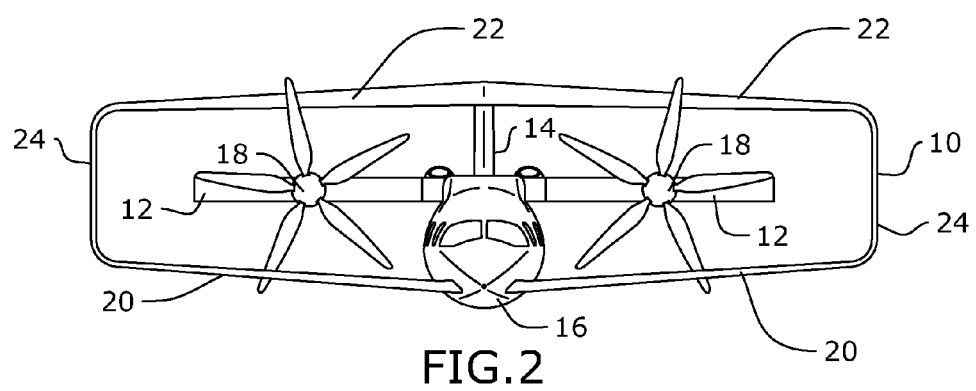
FIG. 2 depicts a front view of certain embodiments of the five-wing aircraft with the tilt-wing in a horizontal configuration.
Figure 3:
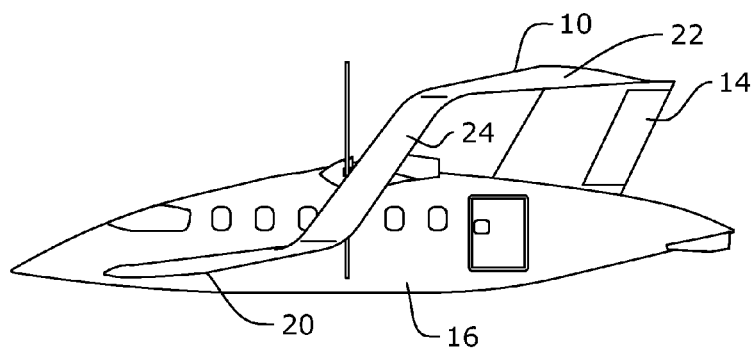
FIG. 3 depicts a side view of certain embodiments of the five-wing aircraft with the tilt-wing in a horizontal configuration.
Figure 4:
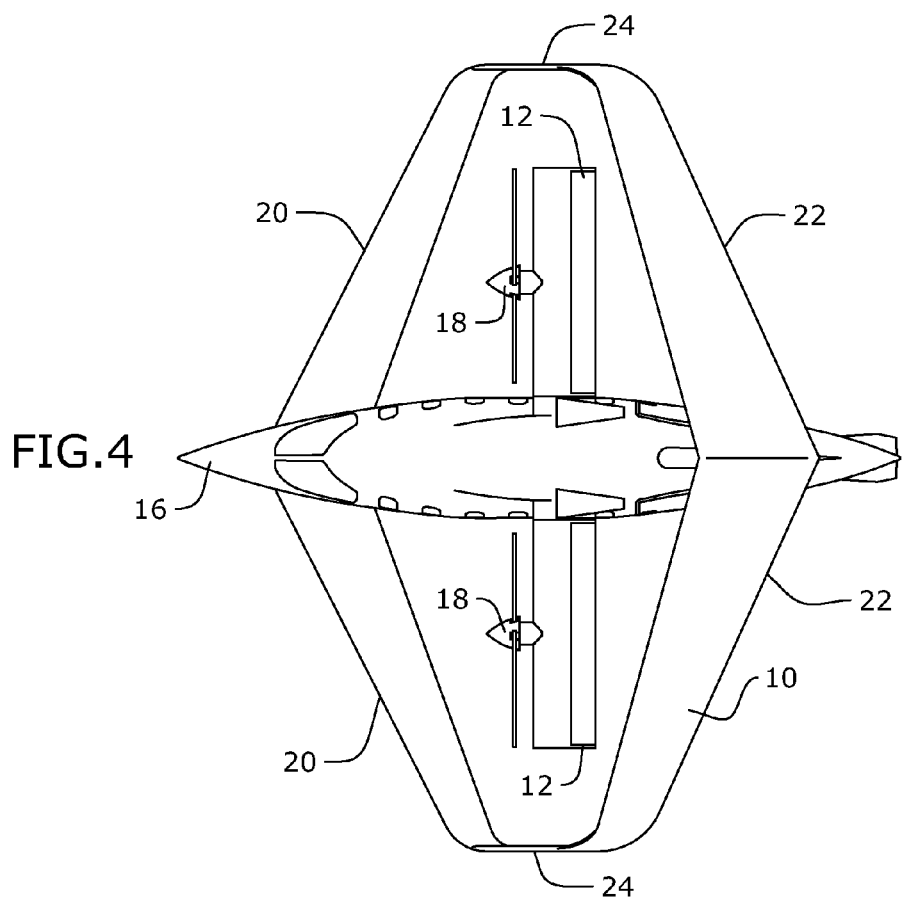
FIG. 4 depicts a top view of certain embodiments of the five-wing aircraft with the tilt-wing in a horizontal configuration.

As depicted in FIGS. 1-4, the five-wing aircraft comprises fixed-wing assembly 10, tilt-wing 12, tail 14, fuselage 16 and rotary wings 18. Fuselage 16 has been streamlined to improve aerodynamics and enhance performance by reducing drag. Fuselage 16 serves as the main body that connects fixed wing assembly 10, tilt-wing 12 and tail 14 together.

Fixed-wing assembly 10 comprises front fixed-wing 20, rear fixed-wing 22 and winglets 24. Front-fixed wing 20 and rear fixed-wing 22 each has a left wing portion and right wing portion divided by fuselage 16 and tail 14. Front-fixed wing 20 is affixed to the front portion of fuselage 16 and rear-fixed wing 22 is affixed to tail 14 located at the rear of fuselage 16. Fixed-wing assembly 10 is arranged in a closed wing configuration such that the tips of front fixed-wing 20 are connected to the tips of rear fixed-wing 22 by winglets 24. In one embodiment, front fixed-wing 20 comprises a degree of dihedral and rear fixed-wing 22 comprises a degree of anhedral.

In a preferred embodiment of the invention, front fixed-wing 20 is swept backward towards the rear of fuselage 16 such that a first angle defined by a longitudinal axis of the fuselage and left or right wing portion of front fixed-wing 20 is less than or equal to 75 degrees. Rear fixed-wing 22 is swept forward towards the front of fuselage such that a second angle defined by the longitudinal axis of the fuselage and left or right portion of rear fixed-wing 22 is less than or equal to 80 degrees. It shall be appreciated that fixed-wing assembly 10 and tail 14 may include any components known in the field such as flaps to enhance lift characteristics of the wings and also control surfaces such as a rudder, elevators, ailerons or any combination of these components.

The fixed-wing assembly design enhances pitch neutrality of the aircraft when in flight at all speeds to improve flight efficiency. This is because front-fixed wing 20 and rear fixed-wing 22 create opposing pitch moments of substantially equal amplitude. This causes front and rear fixed wings 20, 22 to contribute together minimally (null or close to null) to the total pitch moment of the aircraft regardless of the aircraft's altitude or speed during flight.

Tilt-wing 12 is connected to a central portion of fuselage 16 near the aircraft's center of gravity. In this configuration, front-fixed wing 20 is generally positioned within a first horizontal plane and rear fixed-wing 22 is generally positioned within a second horizontal plane. Tilt-wing 12 is positioned substantially equidistant (vertical distance) from the first and second horizontal planes. The design and mounting location of tilt-wing 12 on fuselage 16 causes the tilt-wing to contribute minimally to the total pitch moment of the aircraft regardless of the aircraft's altitude or speed.

Figure 5:
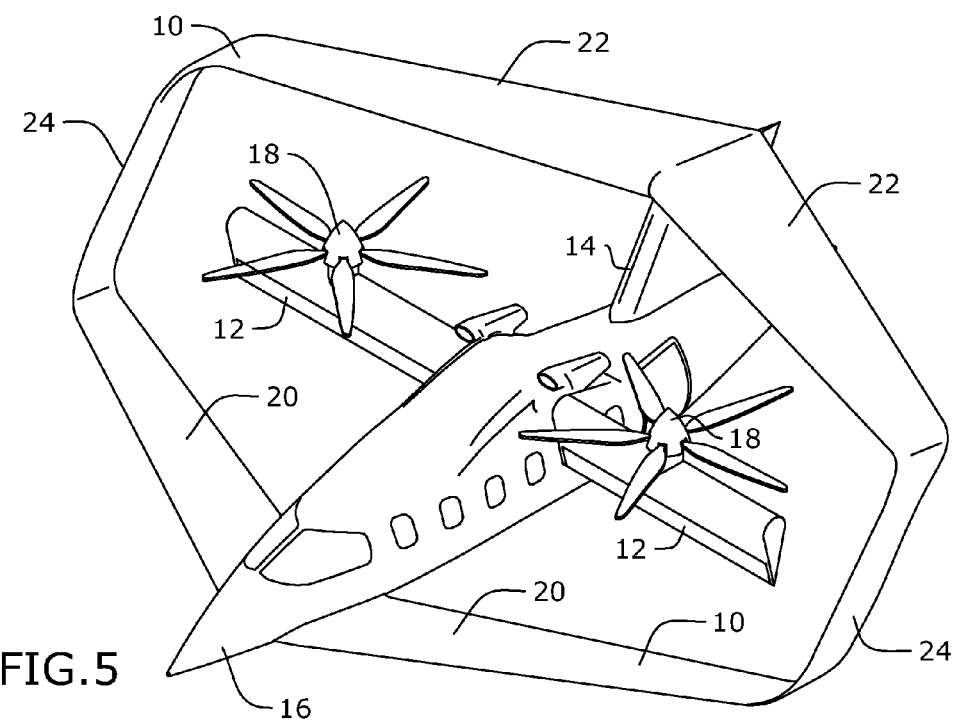
FIG. 5 depicts a perspective view of certain embodiments of the five-wing aircraft with the tilt-wing in a vertical configuration.
Figure 6:
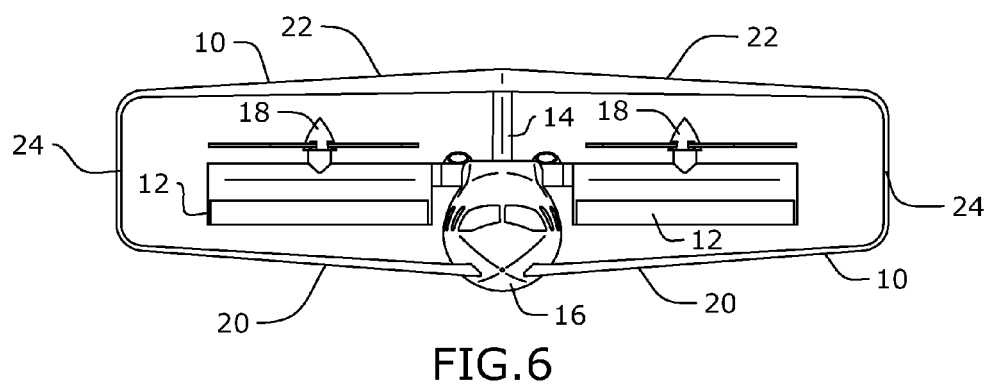
FIG. 6 depicts a front view of certain embodiments of the five-wing aircraft with the tilt-wing in a vertical configuration.
Figure 7:
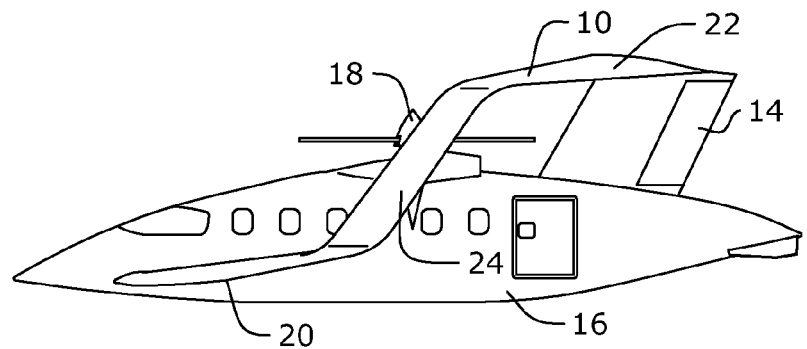
FIG. 7 depicts a side view of certain embodiments of the five-wing aircraft with the tilt-wing in a vertical configuration.
Figure 8:
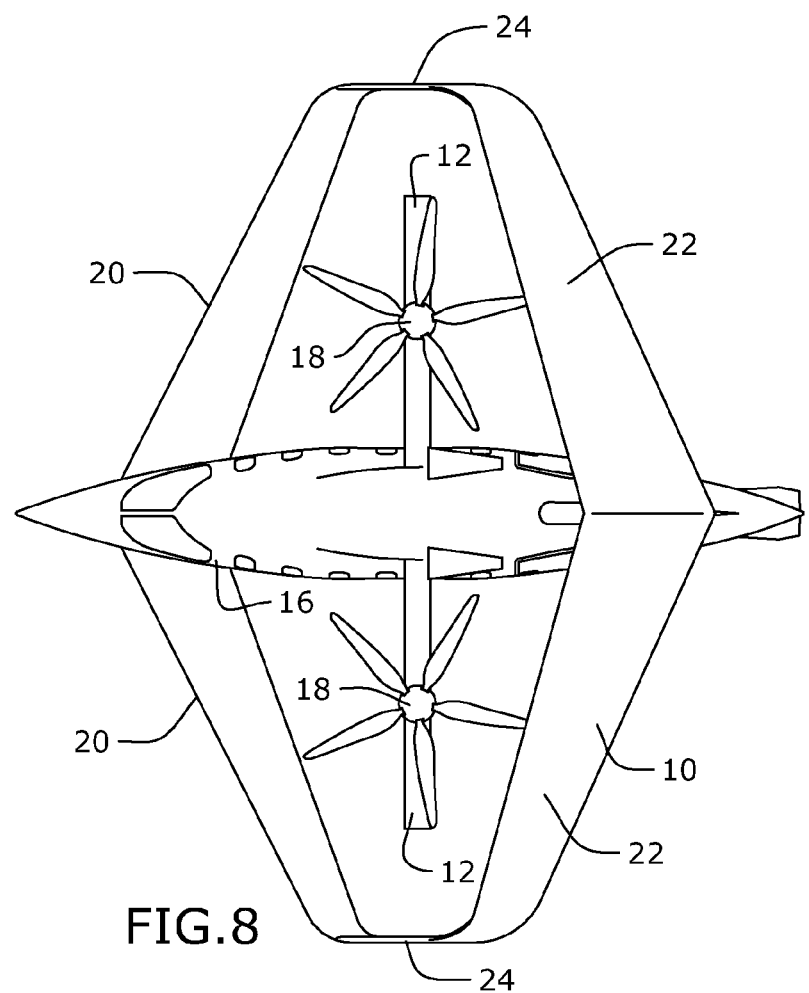
FIG. 8 depicts a top view of certain embodiments of the five-wing aircraft with the tilt-wing in a vertical configuration.

It is understood that tilt-wing 12 is pivotably mounted to fuselage 16 by any components known in the field such as bearings, which are operably connected to the pilot's controls in the aircraft's cockpit. The pilot controls the rotation and orientation of tilt-wing 12 to enable either vertical or horizontal flight of the aircraft. Any mechanical and/or electrical components known in the field may be used to adjust tilt-wing 12 relative to fuselage 16. As depicted in FIGS. 1-4, tilt-wing 12 is shown in a horizontal configuration. As depicted in FIGS. 5-8, tilt-wing 12 is shown rotated to a vertical configuration. However, it shall be appreciated that tilt-wing 12 can rotate to the horizontal plane, vertical plane or any position between the horizontal and vertical planes. In one embodiment, tilt-wing 12 can rotate within a 120 degree range. However, tilt-wing 12 may rotate within alternative ranges of degrees.

A pair of rotary wings 18 is affixed to tilt-wing 12, one rotary wing on each side of fuselage 16. Rotary wings 18 may comprise any type of prop-rotors known in the field. Typically, these prop-rotors comprise blades comprising a diameter that is suitable for lifting the aircraft's weight, including the thrust reserve needed for any take-off conditions, and for permitting the aircraft to safely travel through variable air densities and weather conditions. Rotary wings 18 are configured to generate sufficient thrust to propel the aircraft horizontally or vertically. However, since rotary wings 18 are mounted on tilt-wing 12, tilt-wing 12 can be pivotably adjusted to vector the generated thrust of rotary wings 18 to different positions to permit progressive and smooth flight transitions of the aircraft back and forth between horizontal flight and vertical flight modes. It shall be appreciated that alternative types of thrust generating engines known in the field may be used instead of rotary wings in certain embodiments.

In one embodiment of the invention, tilt-wing 12 comprises four louvers (not shown), two on each side of fuselage 16. Each louver acts independently from the other louvers and aids the pilot in the yaw control, roll control and longitudinal translation control of the aircraft during vertical flight. In one embodiment of the invention, a thruster for use in controlling aircraft pitch in vertical flight mode is secured to the aft fuselage section. This thruster is a "Pitch Notar", which is an internal ducted fan affixed to tail 14 of the aircraft. The thruster can be adjusted to vector generated thrust upwards and downwards to control aircraft pitch.

To operate the five-wing aircraft, the pilot pivotably adjusts tilt-wing 12 to any desired orientation. This enables the aircraft to have performance characteristics of both a fixed-wing aircraft and helicopter. If tilt-wing 12 is oriented in a horizontal orientation as shown in FIGS. 1-4, the aircraft can take off and land as a conventional fixed-wing aircraft. If tilt-wing 12 is oriented in a vertical orientation as shown in FIGS. 5-8, the aircraft can take off and land vertically like a helicopter when rotary wings 18 are operational. The pilot adjusts the magnitude of thrust generated by rotary wings 18 to a desired level. The pilot may find that pivotably adjusting tilt-wing 12 to vector the generated thrust may be useful in certain scenarios such as to smoothly transition the aircraft back and forth between vertical and horizontal flight modes, enable the aircraft to taxi backwards or aid in braking while the aircraft is in air.

Front fixed-wing 20, rear fixed-wing 22, tilt wing 12 and the pair of rotary wings 18 together enhance lift and control of the aircraft at any given flight time. Specifically, the thrust generated from rotary wings 18 and wing-born lift combine and offer a smooth lift distribution and aircraft transition back and forth between vertical and horizontal flight modes. These smooth flight transitions occur without adverse and/or sudden changes in aircraft pitch or altitude. Ultimately, the five-wing aircraft's design results in performance, efficiency and safety advantages over other existing aircraft.

It shall be appreciated that the five-wing aircraft may be flown in a variety of scenarios. For example, the aircraft can complete conventional take-off and landings performed by existing fixed-wing aircraft by adjusting the angle of the tilt-wing to be positioned generally in the horizontal plane, adjusting the magnitude of thrust generated by the rotary wings to a desired level to permit the conventional take-off or landing, and controlling the attitude of the five-wing aircraft by using control surfaces of the aircraft. In these circumstances, attitude refers to the positioning of the aircraft in a three-axes referential, including pitch, roll and yaw axes.

Alternatively, the five-wing aircraft can operate in vertical take-off and landing mode by adjusting the angle of the tilt-wing to be positioned generally in a vertical plane, adjusting the magnitude of thrust generated by the rotary wings to a desired level to permit the vertical take-off or landing, and controlling the aircraft's attitude by using a thruster (Pitch Notar) positioned on the aircraft's tail to adjust aircraft pitch.

Alternatively, the five-wing aircraft can land without power to the rotary wings by maintaining a sufficient aircraft airspeed to prevent a stall by pitching the fuselage down, maneuvering the aircraft towards a clear landing area, increasing the angle of the tilt-wing relative to the horizontal plane to enhance lift and air-braking power of the aircraft, and pitching the fuselage up to permit the aircraft to perform a flare prior to landing in the landing area.

It shall be appreciated that the components of the aircraft described in several embodiments herein may comprise any known materials in the field and be of any color, size and/or dimensions. It shall be appreciated that the components of the aircraft described herein may be manufactured and assembled using any known techniques in the field.

Persons of ordinary skill in the art may appreciate that numerous design configurations may be possible to enjoy the functional benefits of the inventive systems. Thus, given the wide variety of configurations and arrangements of embodiments of the present invention the scope of the invention is reflected by the breadth of the claims below rather than narrowed by the embodiments described above.

What is claimed is:

1. A five-wing aircraft configured to permit smooth transitions between vertical and horizontal flight, the aircraft further configured to enhance pitch neutrality of the aircraft when in flight at all speeds to improve flight efficiency, the five-wing aircraft comprising:
   a fuselage comprising a front portion, central portion and rear portion;
   a fixed wing assembly coupled to the fuselage and comprising a front fixed wing positioned within a first horizontal plane and a rear fixed wing positioned within a second horizontal plane, the front fixed wing coupled to the front portion of the fuselage and the rear fixed wing coupled to the rear portion of the fuselage, the front fixed wing and rear fixed wing being connected together by winglets, the front fixed wing configured to generate a first pitch moment and the rear fixed wing configured to generate a second pitch moment, the first and second pitch moments comprising substantially the same amplitude with opposite signs, thereby causing the front and rear fixed wings to contribute together minimally to a total pitch moment of the aircraft;

a tilt-wing pivotably mounted to the central portion of the fuselage proximate a center of gravity of the aircraft, the tilt-wing being positioned substantially equidistant from the first and second horizontal planes, the tilt-wing in the mounted position configured to contribute minimally to the total pitch moment of the aircraft; and a pair of rotary wings coupled to the tilt-wing, wherein the tilt-wing is configured to be pivotably adjusted to permit the aircraft to transition smoothly between vertical and horizontal flight, wherein the pair of rotary wings are configured to generate thrust or lift depending on the orientation of the tilt-wing;

wherein locations of the front fixed wing, rear fixed wing and tilt-wing relative to the fuselage enhance pitch neutrality of the aircraft during flight regardless of altitude or speed.

2. The five-wing aircraft of claim 1, wherein the front fixed wing is swept backward towards the rear portion of the fuselage such that tips of the front fixed wing are coupled to bottom portions of the winglets, wherein the rear fixed wing is swept forward towards the front portion of the fuselage such that tips of the rear fixed wing are coupled to top portions of the winglets.

3. The five-wing aircraft of claim 2, wherein the front fixed wing comprises a degree of dihedral and the rear fixed wing comprises a degree of anhedral.

4. A method for flying a five-wing aircraft to enable the aircraft to transition smoothly between vertical flight and horizontal flight, the method comprising:

providing the five-wing aircraft, the aircraft comprising:

a fuselage comprising a front portion, central portion and rear portion;

a fixed wing assembly coupled to the fuselage and comprising a front fixed wing positioned within a first horizontal plane and a rear fixed wing positioned within a second horizontal plane, the front fixed wing coupled to the front portion of the fuselage and the rear fixed wing coupled to the rear portion of the fuselage, the front fixed wing and rear fixed wing being connected together by winglets, the front fixed wing configured to generate a first pitch moment and the rear fixed wing configured to generate a second pitch moment, the first and second pitch moments comprising substantially the same amplitude with opposite signs, thereby causing the front and rear fixed wings to contribute together minimally to a total pitch moment of the aircraft;

a tilt-wing pivotably mounted to the central portion of the fuselage proximate a center of gravity of the aircraft, the tilt-wing being positioned substantially equidistant from the first and second horizontal planes, the tilt-wing in the mounted position configured to contribute minimally to the total pitch moment of the aircraft; and a pair of rotary wings coupled to the tilt-wing, wherein the tilt-wing is configured to be pivotably adjusted to permit the aircraft to transition smoothly between vertical and horizontal flight, wherein the pair of rotary wings are configured to generate thrust or lift depending on the orientation of the tilt-wing;

wherein locations of the front fixed wing, rear fixed wing and tilt-wing relative to the fuselage enhance pitch neutrality of the aircraft during flight regardless of altitude or speed; and operating the five-wing aircraft by performing the following steps:

adjusting a magnitude of thrust generated by the pair of rotary wings; and adjusting an angle of the tilt-wing relative to a horizontal plane to vector the generated thrust to permit the five-wing aircraft to transition smoothly back and forth between vertical and horizontal flight.

5. The method of claim 4, further comprising operating the five-wing aircraft in conventional take-off and landing mode by performing the following steps:

adjusting the angle of the tilt-wing to be positioned generally in the horizontal plane;

adjusting the magnitude of the thrust to a desired level to permit the conventional take-off or landing; and controlling an attitude of the five-wing aircraft by using control surfaces of the aircraft.

6. The method of claim 4, further comprising operating the five-wing aircraft in vertical take-off and landing mode by performing the following steps:

adjusting the angle of the tilt-wing to be positioned generally in a vertical plane;

adjusting the magnitude of the thrust to a desired level to permit the vertical take-off or landing; and controlling an attitude of the five-wing aircraft by using a thruster positioned on a tail of the fuselage to adjust pitch of the aircraft.

7. The method of claim 4, further comprising landing the five-wing aircraft without power to the rotary wings by performing the following steps:

maintaining a sufficient airspeed of the aircraft to prevent a stall by pitching the fuselage down;

maneuvering the aircraft towards a clear landing area;

increasing the angle of the tilt-wing relative to the horizontal plane to enhance lift and air-braking power of the aircraft; and pitching the fuselage up to permit the aircraft to perform a flare prior to landing in the landing area.

8. A five-wing aircraft configured to permit smooth transitions between vertical and horizontal flight, the aircraft further configured to enhance pitch neutrality of the aircraft when in flight at all speeds to improve flight efficiency, the five-wing aircraft comprising:

a fuselage comprising a front portion, central portion and rear portion;

a fixed wing assembly coupled to the fuselage and comprising a front fixed wing positioned within a first horizontal plane and a rear fixed wing positioned within a second horizontal plane, the front fixed wing coupled to the front portion of the fuselage and the rear fixed wing coupled to the rear portion of the fuselage, the front fixed wing and rear fixed wing being connected together by winglets, wherein a left portion and a right portion of the front fixed wing are oriented less than or equal to 65 degrees relative to a longitudinal axis of the fuselage, wherein a left portion and a right portion of the rear fixed wing are oriented less than or equal to 80 degrees relative to the longitudinal axis of the fuselage, the front fixed wing configured to generate a first pitch moment and the rear fixed wing configured to generate a second pitch moment, the first and second pitch moments comprising substantially the same amplitude with opposite signs, thereby causing the front and rear fixed wings to contribute together minimally to a total pitch moment of the aircraft;

a tilt-wing pivotably mounted to the central portion of the fuselage proximate a center of gravity of the aircraft, the tilt-wing being positioned substantially equidistant from the first and second horizontal planes, the tilt-wing in the mounted position configured to contribute minimally to the total pitch moment of the aircraft; and a pair of rotary wings coupled to the tilt-wing, wherein the tilt-wing is configured to be pivotably adjusted to permit the aircraft to transition smoothly between vertical and horizontal flight, wherein the pair of rotary wings are configured to generate thrust or lift depending on the orientation of the tilt-wing;

wherein locations of the front fixed wing, rear fixed wing and tilt-wing relative to the fuselage enhance pitch neutrality of the aircraft during flight regardless of altitude or speed.

* * * * *